Nov. 18, 1969  H. A. VAN DER HOEVEN  3,478,525
SHIPBUILDING YARD AND METHOD FOR BUILDING AND LAUNCHING
SHIPS OR SIMILAR FLOATABLE BODIES
Filed Nov. 30, 1967  2 Sheets-Sheet 1
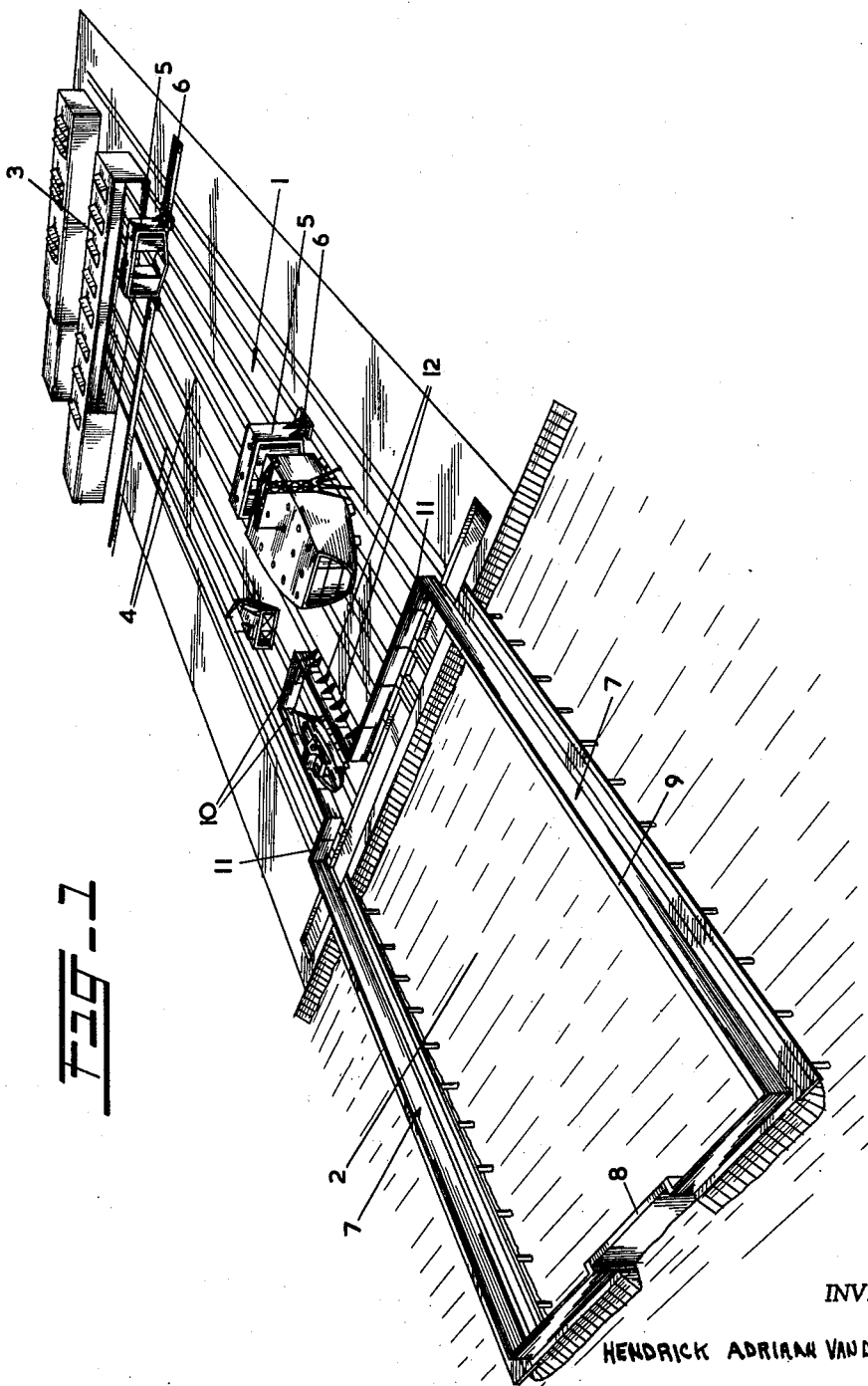
INVENTOR
HENDRICK ADRIAAN VAN DER HOEVEN
BY Jesse D. Reingold
ATTORNEY Nov. 18, 1969    H. A. VAN DER HOEVEN    3,478,525
SHIPBUILDING YARD AND METHOD FOR BUILDING AND LAUNCHING
SHIPS OR SIMILAR FLOATABLE BODIES
Filed Nov. 30, 1967    2 Sheets-Sheet 2
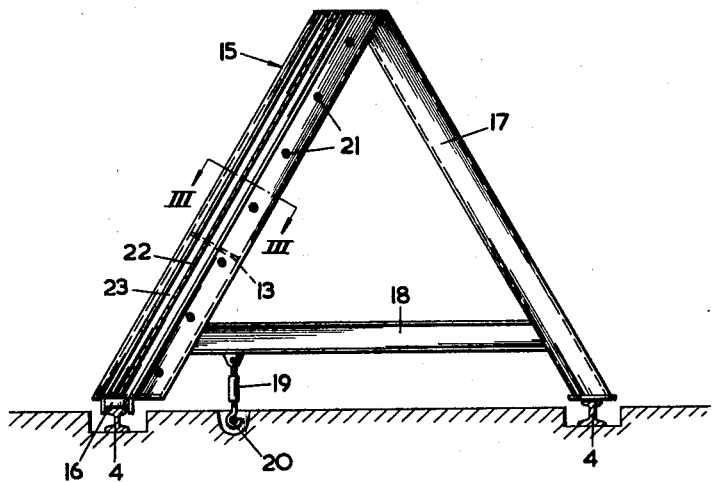
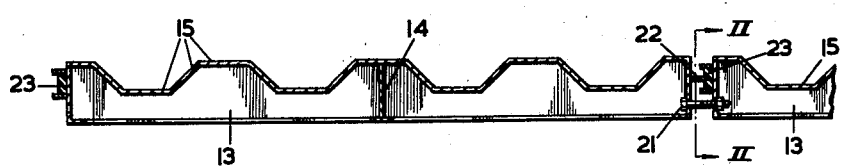
INVENTOR
HENDRICK ADRIAAN VAN DER HOEVEN
BY Jesse D. Reingold
ATTORNEY United States Patent Office 3,478,525
Patented Nov. 18, 1969

3,478,525
SHIPBUILDING YARD AND METHOD FOR BUILDING AND LAUNCHING SHIPS OR SIMILAR FLOATABLE BODIES
Hendrik Adriaan Van der Hoeven, Vlissingen, Netherlands, assignor to N.V. Koninklijke Maatschappij "De Schelde," Vlissingen, Netherlands
Filed Nov. 30, 1967, Ser. No. 686,954
Int. Cl. B63c *3/02, 1/00;* B63b *9/00*
U.S. Cl. 61—64                                                    6 Claims

ABSTRACT OF THE DISCLOSURE

A shipbuilding yard having a workshop for fabricating ship sections and an assembly site for assembling ship sections. The floor of the assembly site being level with that of the workshop so that ship sections can be moved on vehicles from the workshop to the assembly site. A basin adjoining the assembly site is separated from open water by a dike having a lock or gate which permits communication with open water. An embankment on the site being at least partly removable and being adapted to be connected to said dike and to surround a ship to be launched.

---

The invention relates in the first instance to a shipbuilding yard for building and launching ships or similar floatable bodies, comprising an assembly site surrounded at least partly by an embankment, said site having a substantial horizontal floor and adjoining water of sufficient depth for ships built on said assembly site.

The assembly site in the hitherto known shipbuilding yards of this type is formed for a building dock consisting of a large tank of concrete which is anchored near the water's edge in an excavation in the ground. The expanse involved in the digging of the excavation, the pumping away of ground water, and the provision of a floor, which must be heavy in order to prevent subsequent floating of the dock, is considerable. Moreover the dimensions of a building dock are fixed, so that no enlargement is possible in particular in the transverse direction. Since in shipbuilding there is a tendency, in connection with labour cost and automation, to build ships of constantly increasing size, especially tankers, this limitation to the existing dimensions of a building dock is a serious disadvantage. It is the object of the invention to avoid these disadvantages, and to achieve this object, adjoining the assembly site is a basin which is separated from open water by a dike or embankment, in which dike or embankment have been provided lock or caisson gates adapted to prevent or permit communication with open water.

These measures make it possible to situate the assembly site at ground level, so that it can be constructed and enlarged without great cost being involved. In particular the much smaller degree of limitation as to be dimensions of the ships or the like to be built is a considerable advantage of the shipbuilding yard according to the invention.

A preferred embodiment concerns a shipbuliding yard with a workshop where complete ship sections are made. In the case of the conventional building docks, in which the floor is located below ground level, and thus also below the level of the floor of the workshop, the ship sections during transport from the workshop to the assembly site must be transferred with the aid of big cranes. Also in the case of longitudinal slipways these cranes are required for overcoming differences in level. The invention presents the possibility of elminating these big cranes, viz. by fitting the floor of the assembly site and that of the workshop approximately at the same level, in consequence of which the ship sections can be conveyed to the assembly yard on vehicles and aligned with the preceding section that has already been assembled.

When further the embankment on the assembly site is composed of detachable elements, it can be placed close about a ship, so that several ships, drilling platforms, or the like can be assembled simultaneously in the same assembly site, while during the launching of one ship the other ships being assembled remain dry. Moreover, smaller quantities of water have to be pumped away.

A simple and effective solution for the problem of the transport of ship sections from the workshop to the ship being assembled in the assembly site is furnished when on the floor of the assembly yard are laid out a number of rail tracks extending into the workshop.

In this connection it is possible to place the rail tracks in the transverse direction of the ships to be assembled, but rail tracks in the longitudinal direction of the ships are to be preferred, since in that case for one ship only one or two rail tracks for the transport of the sections is (are) required, while the sections can always be placed on the vehicles travelling on the rail tracks in the same place in the workshop.

The rails further present the considerable advantage that they can be used as fastening or supporting members for the elements of the embankment. The water pressure on the embankment can then be taken up in a simple way by supporting the elements of the embankment by means of props engaging a rail adjacent thereto.

The dike or embankment of the basin required in the shipbuilding yard according to the invention further furnishes an opportunity for the construction of a considerable length of finishing quays, while a number of rail tracks can be extended from the assembly site on to the finishing quays.

It is the object of the invention to avoid the use of big cranes for transferring ship sections to the assembly site, and to this end the transport of the ship sections made in the workship towards the ship to be assembled takes place on vehicles, preferably rail vehicles.

The alignment of a section in relation to the part of a ship's hull that has already been assembled may be effected by means of vertical and horizontal jacks which may be separately present on the spot, but preferably the vehicles themselves are equipped with means for shifting a ship section in the vertical direction and means for shifting it in the horizontal direction, such as a vertical and a horizontal jack, respectively.

Finally the invention relates to a ship or a similar floatable body constructed accordng to the above-mentioned method.

The invention will be explained more fully by reference to the figures.

FIG. 1 shows a perspective view of an embodiment of a ship-building yard according to the invention.

FIG. 2 shows a side elevation of an embankment element viewing in the direction of the line II—II in FIG. 3.

FIG. 3 shows a cross-section along the line III—III in FIG. 2.

The shipbuilding yard shown in the drawing mainly consists of an assembly site 1, which at one end adjoins a basin 2 at a lower level and at the other end adjoins a workshop 3 for making ship sections, situated at the same level. The assembly site 1, in which several ships, drilling platforms, or the like can be assembled simultaneously, is provided with a set of parallel rail tracks 4 extending in the logitudinal direction of the ships to be built and continuing into the workshop 3.

The ship sections made in the workshop 3 are transported to the ship that is being assembled on vehicles 6 adapted to travel on the rail tracks. These vehicles 6 are equipped with vertical and horizontal jacks for the alignment of a section placed on the vehicles in relation to the section that was assembled last. Big cranes therefore are not required.

The basin is surrounded by a dike or embankment 7, provided with lock or caisson gates 8. On either side of the parts of the embankment 7 adjoining the asembly site, platforms 9 have been provided, which serve as finishing quays, a number of rail tracks 4 being extended on to the quays.

When a hull has been completed and must be launched, close about the hull will be placed an embankment 10, which is connected via transverse extensions 11 with the embankment 7 of the basin 2. When the water level in the basin 2 is raised to such an extent that the water flowing from that basin inside the embankment 10 causes the hull to float, this hull can be introduced afloat into the basin and after lowering of the water level can be moved into open water via the gates 8.

The embankment 10 and the transverse extensions 11 are composed of elements consisting, for instance, of steel partitions and anchored with the rails of the rail tracks 4 which serve as fastening or supporting members. For the support of the partitions and the taking up of the water pressure use may be made of props 12, which further engage with an adjacent rail.

The embankment element shown by way of example in FIGS. 2 and 3 consists of a corrugated partition 15 provided with horizontal and vertical stiffenings (13 and 14, respectively), which partition rests at the bottom via a gasket 16 on a rail and is supported at the top, near the vertical stiffenings 14, via props 17 on another rail. Cross beams 18 prevent deformation of the joint between the corrugated partition 15 and the props 17, while on the lower side of these beams is provided a stretching screw 19, a hook of which can be connected with a ring 20 incorporated in the floor. The connection between the embankment elements is brought about by means of bolts 21, a pressure strip 22 of one element being forced into a gasket 23 of the other element.

It is observed that the shipbuilding yard and the method according to the invention are particularly advantageous for the construction of very large ships, tankers with a deadweight capacity of 500,000 tons already being thought of. The use of a longitudinal slipway of the assembly of such ships involves the disadvantages that the slipway comes to lie at a very high level and that very heavy cranes for the transport of the sections are required. In connection with high loads on the quays and the risks incurred in launching, transverse slipways cannot be used for the construction and launching of very large ships. As compared with building docks, the shipbuilding yard according to the invention can be constructed at considerably lower cost, while there are no limitations as to the dimensions of ships to be built. Whilst a building dock cannot be extended in the transverse direction, with the assembly site according to the invention growth is always possible. The avoidance of big cranes for overcoming differences in level during the transport of the sections moreover affords a considerable economy.

What I claim is:
1. A shipbuilding yard for building and launching ships or suchlike floatable bodies, comprising a workshop for prefabricating ship sections, an assembly site for assembling ships from said sections, the floor of the assembly site being approximately level with that of the workshop so that ship sections may be transmitted by vehicle means from the workshop to the assembly site, a basin adjoining the assembly site and separated from open water by a dike having means which permit communication with said open water, said dike comprising a wall at the seaward end of the assembly area having removable sections forming with said dike wall an enclosure on said assembly site whereto the ship may be transferred whereby the water level in said basin can be raised to such an extent that the water flowing inside said embankment permits the ship to float into said basin.

2. A shipbuilding yard according to claim 1, wherein a plurality of tracks are provided on the floor of the assembly site and extend into said workshop, said vehicle means being transportable on said rail tracks.

3. A shipbuilding yard according to claim 2, wherein said embankment on the assembly site is composed of detachable elements associated with said rails which serve as the base members.

4. A shipbuilding yard according to claim 3, wherein props associated with adjacent rails support said detachable elements.

5. A shipbuilding yard according to claim 4, wherein horizontal beams are disposed between and secured to said props and said detachable elements, and means for securing said horizontal beams to the floor of said assembly site.

6. A shipbuilding yard according to claim 2, wherein finishing quays are provided on the dike forming said basin, and some of said rail tracks extend beyond said assembly site on to said quays.

References Cited

UNITED STATES PATENTS

| 566,734 | 9/1896 | Boggs et al. | 61—64 |
| 2,245,486 | 6/1941 | Little | 61—64 |
| 2,337,101 | 12/1943 | Harris | 61—67 X |
| 3,011,252 | 12/1961 | Svensson | 114—65 X |

FOREIGN PATENTS

| 641,534 | 5/1962 | Canada. |
| 496,225 | 7/1919 | France. |

JACOB SHAPIRO, Primary Examiner

U.S. Cl. X.R.

114—65